US006910142B2

United States Patent
Cross et al.

(10) Patent No.: US 6,910,142 B2
(45) Date of Patent: Jun. 21, 2005

(54) SYSTEM FOR DETECTION AND ROUTING OF PLATFORM EVENTS IN A MULTI-CELL COMPUTER

(75) Inventors: Edward A Cross, Fort Collins, CO (US); Michael S Allison, Fort Collins, CO (US); Christopher S Kroeger, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

(21) Appl. No.: 09/917,413

(22) Filed: Jul. 28, 2001

(65) Prior Publication Data

US 2003/0070066 A1 Apr. 10, 2003

(51) Int. Cl.[7] .............................. G06F 1/32; G06F 13/00; H05K 7/10
(52) U.S. Cl. ........................ 713/324; 713/300; 713/320; 713/323; 710/301; 710/302; 710/304
(58) Field of Search ................................. 713/300, 320, 713/323, 324; 710/301, 302, 303, 304

(56) References Cited

U.S. PATENT DOCUMENTS

| 5,784,576 A | * | 7/1998 | Guthrie et al. ............... 710/302 |
| 6,138,194 A | * | 10/2000 | Klein et al. .................. 713/340 |
| 6,181,030 B1 | * | 1/2001 | Carpenter et al. ........... 307/113 |
| 6,286,066 B1 | * | 9/2001 | Hayes et al. ................. 710/302 |
| 6,658,507 B1 | * | 12/2003 | Chan .......................... 710/100 |
| 6,771,510 B1 | * | 8/2004 | Novak et al. ................ 361/727 |

* cited by examiner

Primary Examiner—Lynne H. Browne
Assistant Examiner—James K. Trujillo (57) ABSTRACT

A system for providing notification, to the associated operating system, of removal and replacement of I/O devices during operation of a multiprocessor computer system running multiple operating systems. The system includes a plurality of cells, each containing multiple RISC processors, low-level I/O firmware, a local service processor, scratch RAM, external registers, a memory and I/O manager, and interfacing hardware. Each partition comprises one or more cells and runs its own operating system (OS). Each cell is connected to a peripheral backplane containing a plurality of peripheral I/O card slots via a switch on the system backplane, which also connects the cell to a supervisory processor, which sends card slot status information to the appropriate cell. Each I/O (typically PCI) card slot has an associated latch which provides an indication, to the supervisory processor, that a platform event has occurred. Platform events include inserting or removing an I/O (peripheral device interface) card to/from a card slot, and opening an access panel that provides access to the I/O cards.

20 Claims, 6 Drawing Sheets

SYSTEM FOR DETECTION AND ROUTING OF PLATFORM EVENTS IN A MULTI-CELL COMPUTER

FIELD OF THE INVENTION

The present invention relates generally to computer systems, and more particularly, to a system that provides notification, to the associated operating system, of removal and replacement of I/O devices during operation of a multiple cell, multiprocessor computer system running multiple operating systems.

BACKGROUND OF THE INVENTION

Statement Of The Problem

In a computer system comprising multiple processors and operating systems, there are a number of problems associated with removing and inserting (swapping) cards containing I/O (or other) devices while the system is operating. These problems include detection of card removal and insertion, and providing notification thereof to the operating systems associated with the card slots containing the particular cards being swapped.

In addition, when access to these I/O cards is gained via intrusion into a cabinet containing the cards, most previously known computer systems typically ignore the intrusion and risk computer system failure if a card is removed while the system is running.

Furthermore, these prior systems also typically perform I/O device discovery every time the systems are re-booted, since they are unable to determine whether I/O devices were added or removed prior to a particular boot operation, and are thus unable to determine the I/O device configuration at boot time without re-scanning for I/O devices.

Previous computer systems having multiple processors and operating systems have also not effectively dealt with other problems presented by detection and routing of platform events associated with the insertion and removal of I/O cards while the system is operating.

An additional problem is encountered in prior systems having latches that indicate when an I/O card has been removed from its slot. When an I/O card is removed from a slot, the slot associated with the latch causes the power to the slot to be turned off. Once the slot is detected by the system as being powered down, it is marked as deconfigured. Therefore, after a card is re-inserted in the slot, the slot (i.e., the card) is not available for use until after a re-boot operation on the partition is performed, and the slot is reset.

Solution To The Problem

The present system solves the above problems and achieves an advance in the field by providing a mechanism for removing and installing I/O hardware while a computer system is operating. The system includes a novel method for detecting and routing information concerning the occurrence of events associated with the removal and replacement of system I/O cards from their respective slots.

The architecture of the present system includes one or more partitions, each including a plurality of cells, each containing multiple RISC processors, low-level I/O firmware, a local service processor, scratch RAM, external registers, a memory and I/O manager, and interfacing hardware. Each partition runs its own operating system (OS).

Each cell is connected to a peripheral backplane containing a plurality of peripheral I/O card slots via a switch on the system backplane, which also connects the cell to a supervisory processor, which sends card slot status information to the appropriate cell.

Each I/O (typically PCI) card slot has an associated latch which provides an indication, to the supervisory processor, that a platform event has occurred. Platform events include inserting or removing an I/O (peripheral device interface) card to/from a card slot, and opening an access panel that provides access to the I/O cards. The access panel has an intrusion door with a latch connected to a switch for indicating the open or closed state of the intrusion door. A 'doorbell' button is located adjacent to each card slot for indicating that a user is ready to remove an I/O card from the slot.

When a platform event occurs, the supervisory processor notifies the local service processor in the cell containing the firmware and OS responsible for controlling the card associated with the particular event. The local service processor then notifies the firmware and OS responsible for the relevant slot. The supervisory processor has knowledge of which partition should be notified of particular events, so it notifies only the service processors in the relevant partition. Communication between the supervisory processor, local service processor, and firmware is accomplished via scratch RAM, which is cheaper than general purpose hardware registers.

More specifically, when a doorbell button is pressed, the following sequence takes place:

(a) An interrupt is generated that notifies the supervisory processor of the event;

(b) the supervisory processor sends a 'doorbell pressed' message to the local service processor on the cells containing the OS responsible for the relevant I/O card slot;

(c) the local service processor indicates the doorbell status by writing a message to scratch RAM, and also by causing an interrupt to be sent to the OS on its cell board;

(d) the OS then calls the firmware to get the specific doorbell event;

(e) the firmware notifies the OS of the specific slot that is associated with the doorbell event; and (f) the I/O driver for the slot is shut down and the slot/resident board is powered off.

The board may then be removed from the slot for replacement. When a board is re-inserted into the slot, a latch interrupt is generated, and the following steps are performed:

(a) The interrupt notifies the supervisory processor of the event;

(b) the supervisory processor sends a 'latch open' message to the local service processor on the cells containing the OS responsible for the relevant I/O card slot;

(c) the local service processor indicates the latch status by writing a message to scratch RAM, and also by causing an interrupt to be sent to the OS;

(d) the OS then calls the firmware to get the specific latch event;

(e) the firmware notifies the OS of the specific slot that is associated with the latch event; and (f) the I/O driver for the slot is enabled and the slot/resident board is powered up.

Therefore, after a card is re-inserted in the slot, the card is available for use, without waiting for a re-boot operation on the partition.

A further aspect of the present system is the inclusion of an intrusion latch on the access panel to the cabinet containing the I/O cards. When the access panel is opened, the supervisory processor is notified of the event. Intrusion events are reported to the appropriate OS in a manner similar to the doorbell and latch events described above. If no intrusion is detected between successive boot operations, boot time is significantly reduced by avoiding initial scanning for non-existent devices. The present method handles intrusion events by reporting an event only once to the appropriate entities.

DETAILED DESCRIPTION

Figure 1:
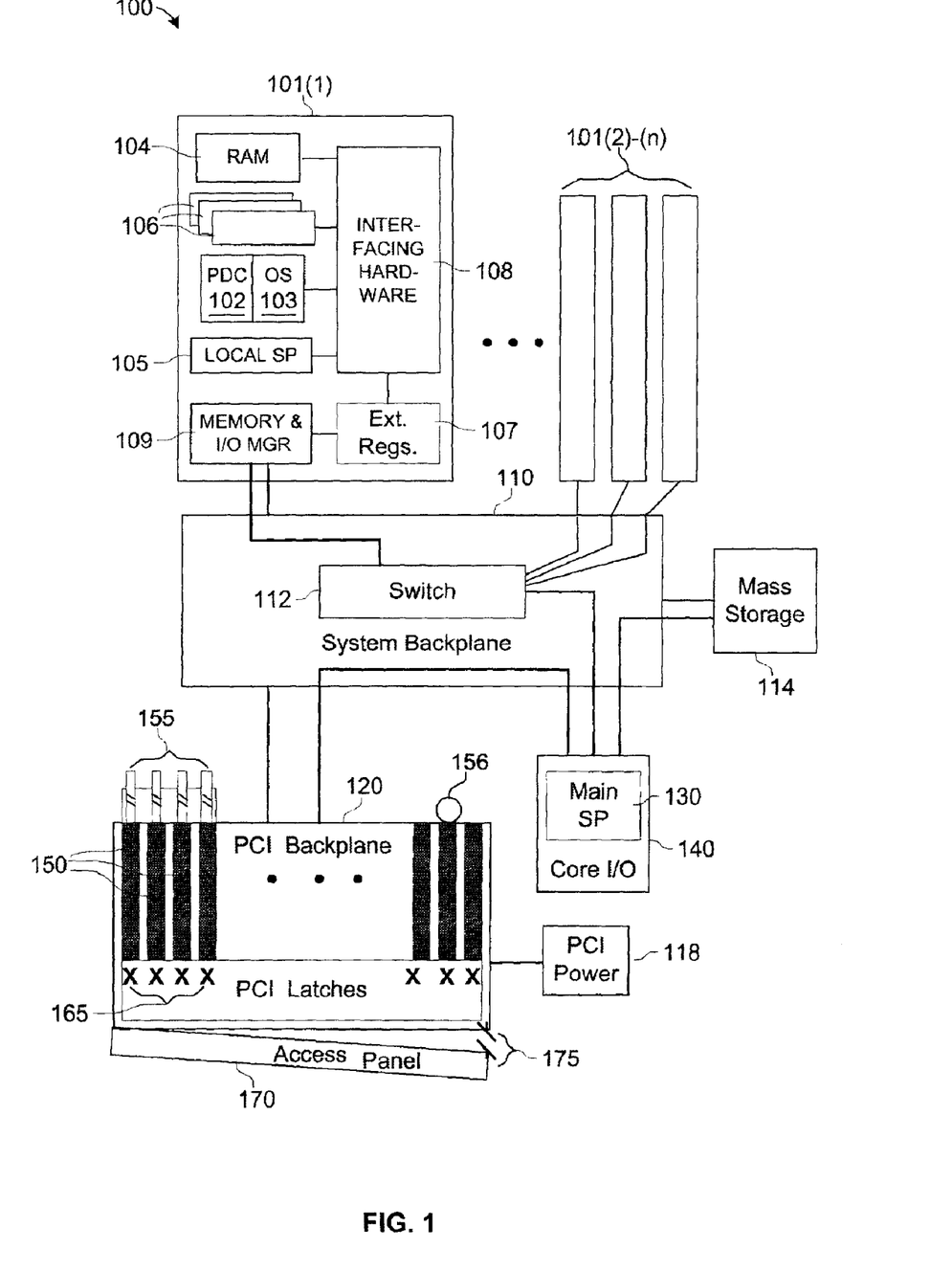
FIG. 1 is a block diagram illustrating exemplary components of a multi-cell computer for which the present system provides detection and routing of platform events to each cell.

FIG. 1 is a block diagram illustrating an exemplary embodiment of the present multi-cell computer system 100 which provides detection and routing of platform events for each cell 101 in the system. As used herein, the term 'cell' refers to an entity (typically a single board) comprising a group of processors 106 that share memory and I/O resources. A plurality of cells 101 may be combined, as a partition, to execute one instance of an operating system 103. As shown in FIG. 1, system 100 comprises a plurality of cells 101 connected, via switch 112 in system backplane 110, to a plurality of I/O card slots 150 in PCI (I/O card) backplane 120. Note that where there is a plurality of similar devices, a single one of the devices is hereinafter denoted by a reference number followed by a wild card symbol; e.g., cell 101* represents any one of the cells 101(1)–101(n); the plurality of similar devices is simply denoted by the reference number only.

System 100 also includes a supervisory processor 130, core I/O devices 140, and mass storage 114 interconnected, via system backplane 110 and switch 112, with cells 101 and PCI backplane 120. Each cell 101* includes a one or more main processors 106 (typically 4), a local service processor 105, external hardware registers 107, memory & I/O manager 109, scratch RAM 104, and interfacing hardware 108. Each main processor 106* in a given partition is associated with one instance of the OS (operating system) 103. Each processor 106 has associated firmware, hereinafter referred to as platform dependent code (PDC) 102, for managing low-level I/O functions including booting the OS 103 across one or more cells 101. There is one PDC image per cell, therefore all processors 106 in a given cell 101* share the same PDC 102.

The supervisory processor, herein after referred to as the main service processor (MSP) 130, performs functions including receiving notification of events and sending event information to each cell 101*. Local service processor (LSP) 105 coordinates event handling between main service processor 130 and main processors 106. In an exemplary embodiment, processors 106* are RISC processors, which perform the major computing functions in system 100.

Each card slot 150* in PCI backplane 120 has a card insertion latch 165* and a manually activated switch (e.g., a pushbutton switch) 155* associated therewith. Switch 155* functions as a 'doorbell' to provide notification to that a user is ready to replace an I/O card in one of the slots 150*. Each group of card slots 150 is accessed through an access panel 170, the open or closed condition of which is detectable via a switch 175.

Figure 2A:
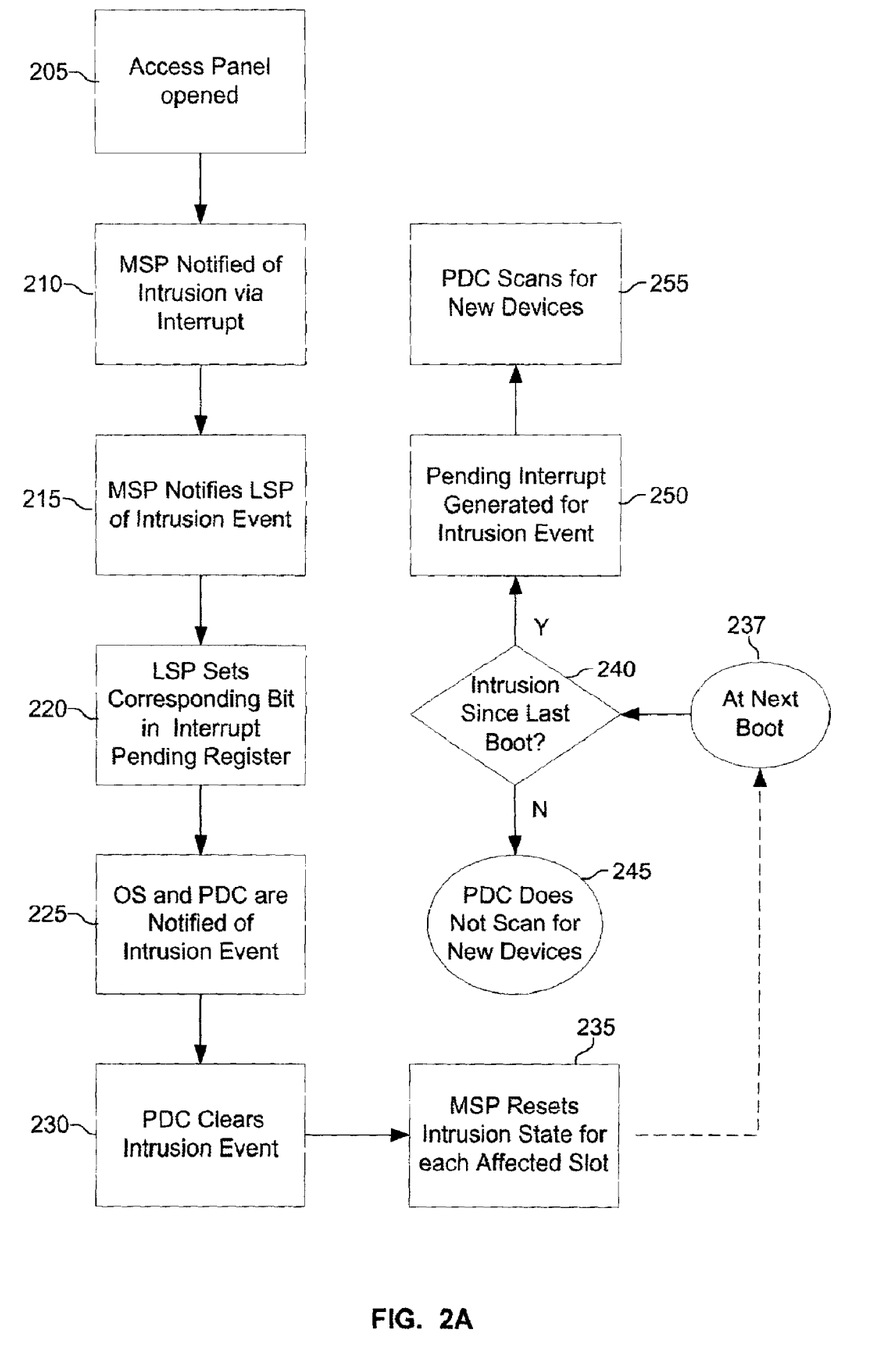
FIG. 2A is a flowchart illustrating exemplary steps performed in detection and routing of intrusion events.

FIG. 2A is a flowchart illustrating, at a high level, exemplary steps performed in detection and routing of intrusion events. As shown in FIG. 2, when access panel 170 is opened, at step 205, switch 175 detects the intrusion, causing an interrupt to be generated. At step 210, main service processor 130 is notified of the intrusion via the interrupt. At step 215 MSP 130 then sends an intrusion event message to local service processor 105. Intrusion data comprises two types of information, both of which may be stored in external registers 107. There is an event register indicating that intrusion has occurred since the event was last cleared, and an intrusion status register indicating current intrusion latch status. Intrusion latch status is always placed in an external register, and intrusion event data is stored either in an external register or in scratch RAM intercommunication memory (ICM) 104. Local service processor 105 updates either external registers or ICM with intrusion event data, as explained below.

At step 220, local service processor 105 sets the event-corresponding bit in the interrupt pending register. At step 225, LSP notifies OS 103 of the intrusion event, and OS 103 then notifies PDC 102. At step 230, the intrusion event is cleared by PDC 102, since all concerned entities have now been informed of the intrusion. At step 235, main service processor 130 resets the intrusion state, for each affected card slot, in the intrusion status register.

After the next time the system is booted, at step 237, a check is made of previously saved uncleared intrusion events or any new intrusion events by main service processor 130, at step 240, to determine whether an intrusion occurred since the last boot. If access panel 170 has not been opened since the previous boot, then, at step 245, PDC 102 does not have to scan for new devices, since the device configuration is known to be unchanged. Therefore, by avoiding scanning for non-existent devices, the present system allows the boot process to occur more quickly when no intrusion has occurred between boot operations. If, however, it is determined that an intrusion occurred since the last boot, then at step 250 the previously pending interrupt is generated for the intrusion event, and PDC 102 scans for new devices, at step 255.

Figure 2B:
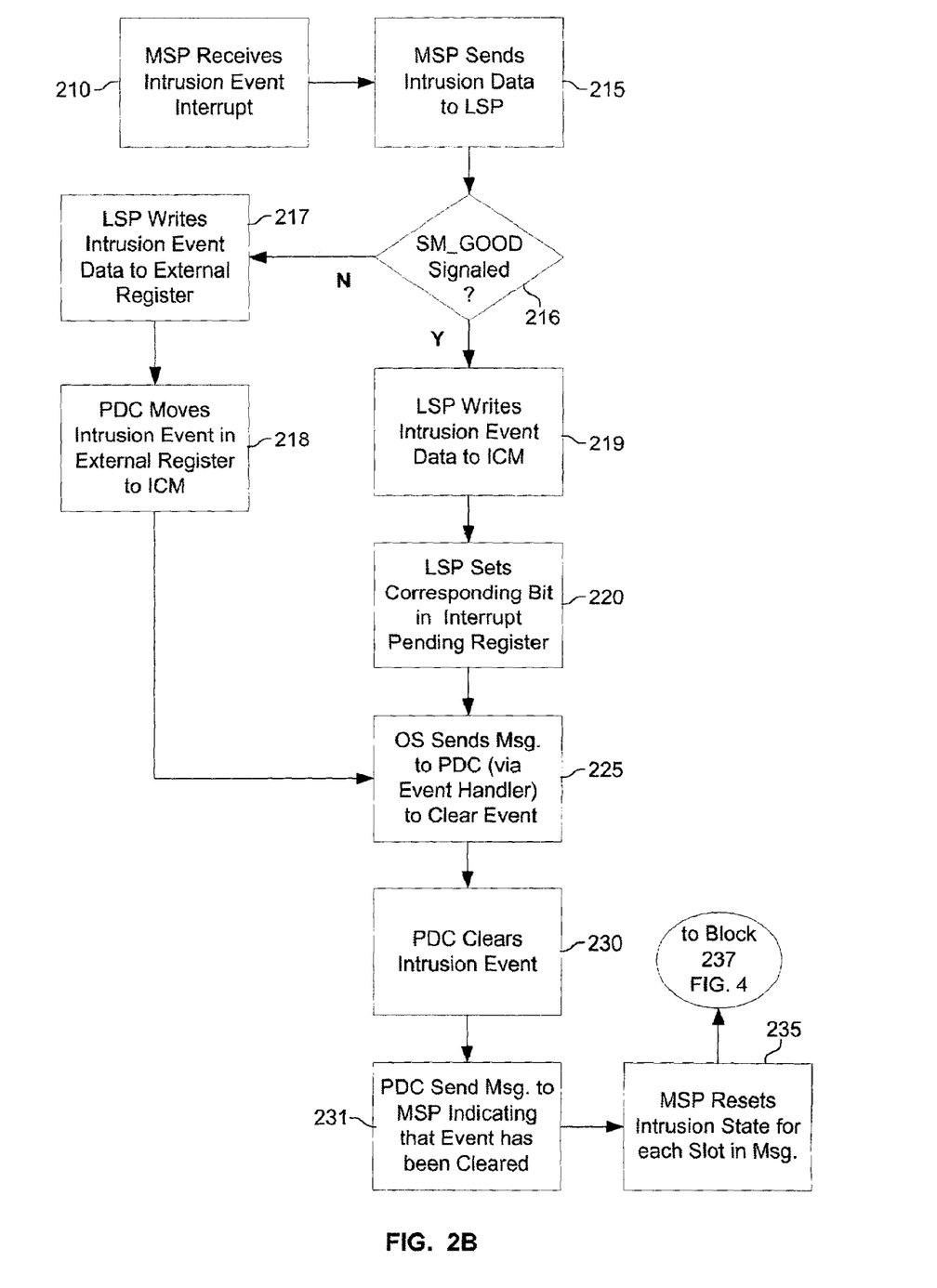
FIG. 2B is a flowchart illustrating, in greater detail, exemplary steps performed in intrusion event handling.

FIG. 2B is a flowchart illustrating, in greater detail, exemplary steps performed in intrusion event handling. After main service processor 130 is notified of the intrusion event, and MSP 130 sends an intrusion event message to local service processor 105 (steps 210 and 215), then at step 216, local service processor 105 checks to see if PDC 102 has signaled that the PDC code has initialized the shared memory communication path between the PDC and the main service processor 130. In the present embodiment, this situation is indicated by an SM_GOOD signal from the PDC. If the shared memory (in FIG. 1, block 108) has not been initialized, then at step 217, local service processor 105 writes the intrusion event data to an external register 107.

At step 218, PDC 102 moves the intrusion event data in external register 107 to inter-communication memory (ICM) 104 of FIG. 1. Intrusion event processing then continues at step 225, described below.

If, at step 216, it was determined that the shared memory has been initialized, then, at step 219, local service processor 105 writes intrusion event data to ICM in block 104. At step 220, local service processor 105 sets the event-corresponding bit in the interrupt pending register, and at step 225, OS 103 sends a message to PDC 102 (via an event handler) to clear the event from the event register. At step 230, the intrusion event is cleared by PDC 102 at the request of the OS 103. At step 235, main service processor 130 resets the intrusion state, for each affected card slot, in the intrusion status register, and intrusion event processing continues at step 237 in FIG. 2A, as described above.

Figure 3:
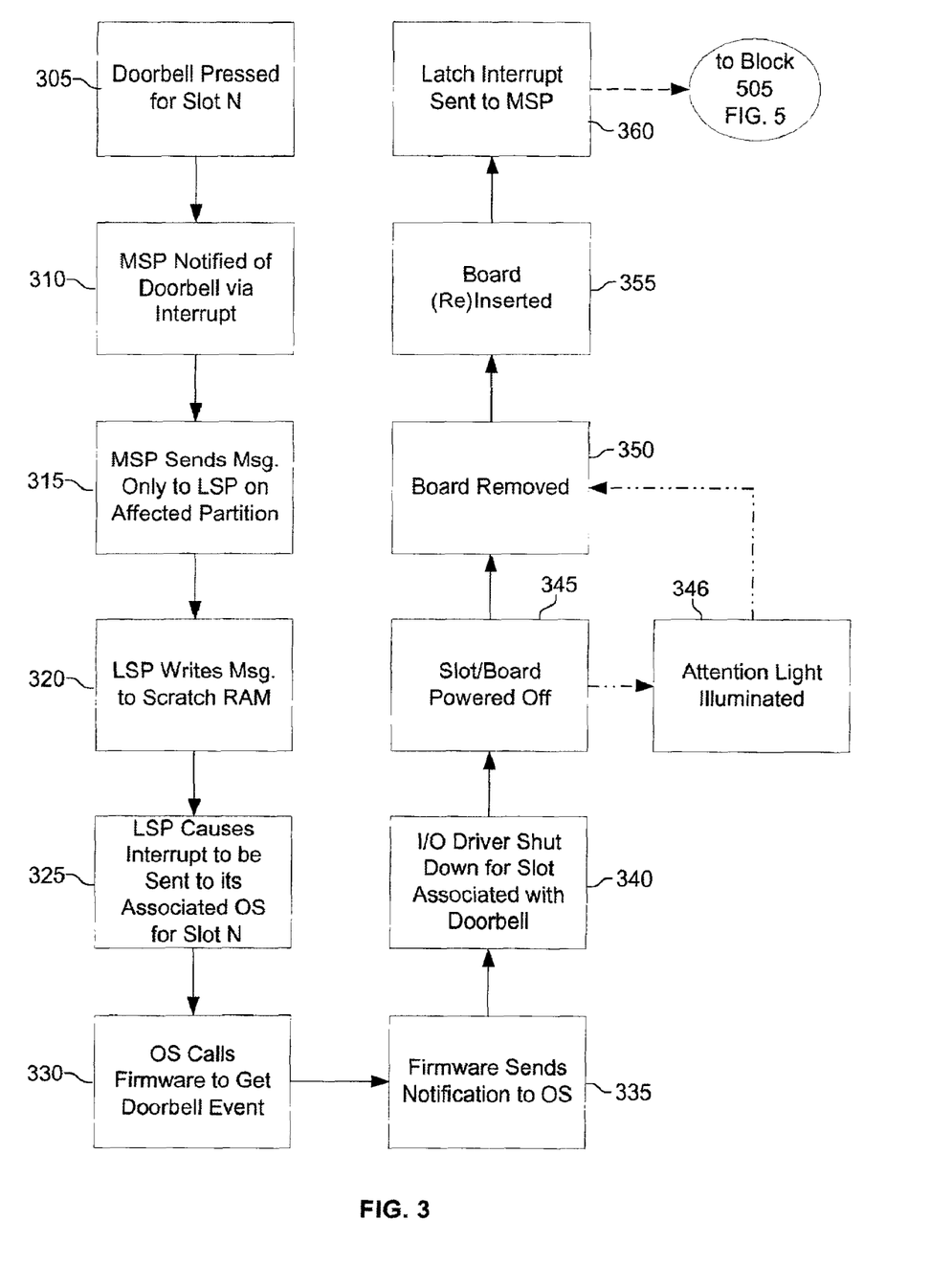
FIG. 3 is a flowchart illustrating exemplary steps performed when a 'doorbell' is pressed.

FIG. 3 is a flowchart illustrating exemplary steps performed when a 'doorbell' is pressed in system 100. As shown in FIG. 3, at step 305, a user presses a 'doorbell' pushbutton switch 155 associated with a specific card slot 150 containing an I/O card that is to be removed, so that it can be repaired or replaced. At Step 310, main service processor 130 is notified of the doorbell event by an interrupt generated when switch 155 was pressed. At step 315, main service processor 130 then sends a message to only the local service processor 105 on the affected partition. More specifically, main service processor 130 sends a message to the LSP 105 in the cell 101* associated with the card slot 150 for which the doorbell was pressed.

At step 320, local service processor 105 writes the card slot identifying information (e.g., slot N) to an area in scratch RAM (ICM) 104 reserved for doorbell data. At step 325, LSP 105 causes an interrupt for slot N to be sent to its associated OS 103. When the interrupt is serviced, at step 330, the OS issues a call to a PDC function to get the doorbell event from ICM 104. The PDC function sends the doorbell event and physical location to the OS 103, at step 335.

At step 340, the I/O driver(s) (located on core I/O card 140) for the slot 150 associated with the doorbell 155 is (are) quiesced. OS 103 then turns off power to card slot N, at step 345, by notifying the appropriate controller (not shown) to power down the slot. At step 346, an attention light 156 is optionally illuminated to notify the user that it is OK to remove the I/O board (in slot N) associated with the doorbell that was pressed. At step 350, the board is removed from slot N, and at step 355, a board is (re)inserted into the slot. Insertion of a board into the slot causes closure of a latch (switch) 165 associated with the slot, which in turn triggers a latch interrupt. This latch interrupt is sent to main service processor 130 at step 360, and doorbell/latch processing continues at step 505 in FIG. 5, as described below.

Figure 4:
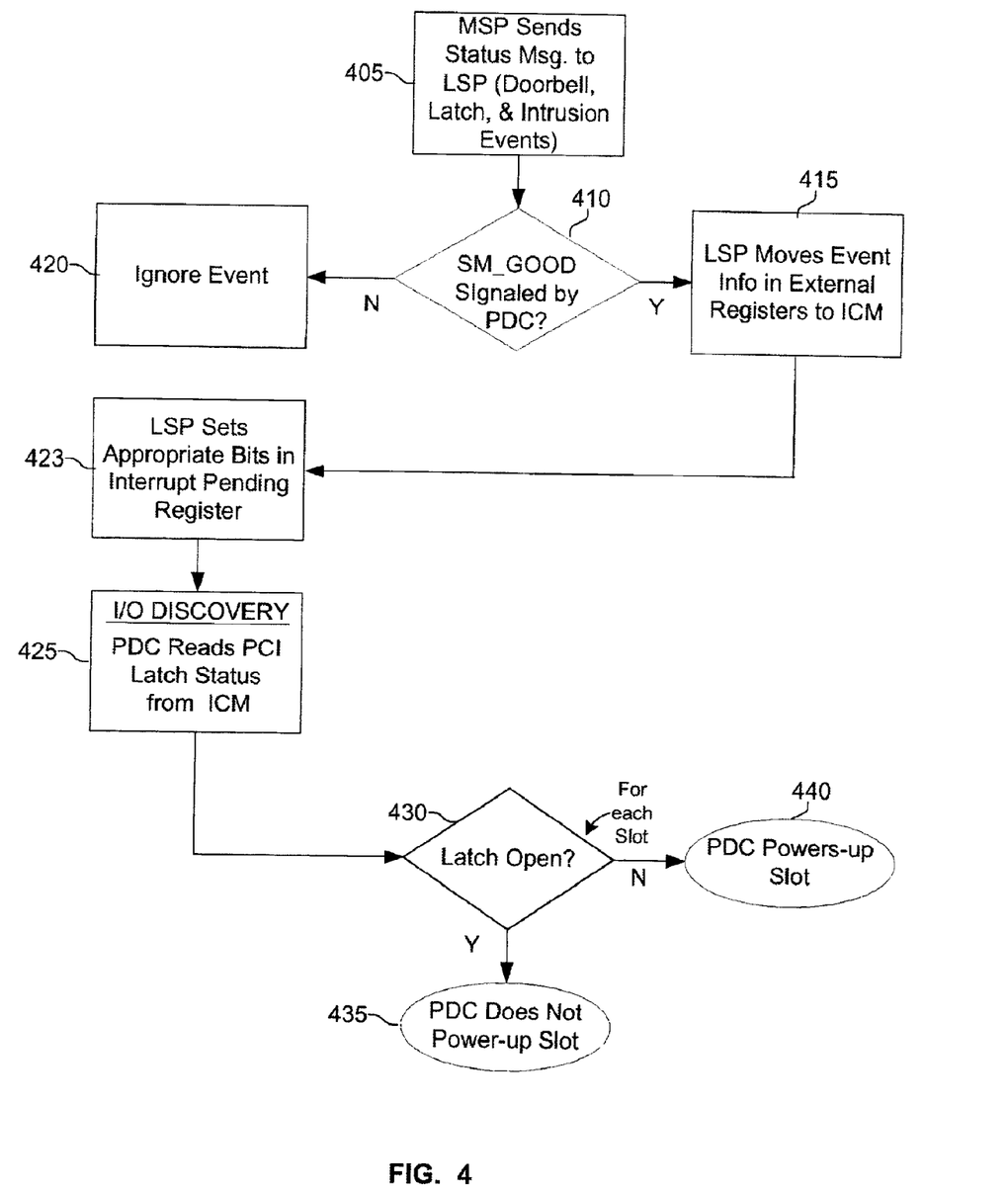
FIG. 4 is a flowchart illustrating exemplary steps performed during the latch initialization process.

FIG. 4 is a flowchart illustrating exemplary steps performed during the latch initialization process, which takes place prior to I/O discovery. As shown in FIG. 4, at step 405, if a latch interrupt is generated (because a board was removed from its slot), main service processor 130 sends a status message to local service processor 105. Note that the status message may, alternatively, indicate a doorbell or an intrusion event. If, at step 410, PDC 102 has signaled (via an SM_GOOD signal) that the shared memory (in block 108) between the PDC and main service processor 130 has been initialized, then, at step 415, local service processor 105 moves the event information in external registers 107 to ICM (scratch RAM) 104, and latch initialization continues at step 423. If the shared memory has not been initialized, then at step 420, the event is ignored, since shared memory must be initialized prior to I/O discovery (at step 425). At step 423, local service processor 105 sets the appropriate latch status bits in the interrupt pending register.

At step 425, I/O discovery takes place. I/O discovery is part of the PDC boot process. During boot, PDC 102 initializes processors 106, ICM 104, and I/O devices. When the PDC finds and initializes I/O, the I/O discovery phase occurs. During this step, PDC 102 reads the latch status from ICM 104. Next, at step 430, PDC 102 checks the latch status for each card slot 150. If a given latch 165 is closed, the PDC powers up the associated slot (step 440); if a given latch is open, the PDC does not power up the slot (step 435).

Figure 5:
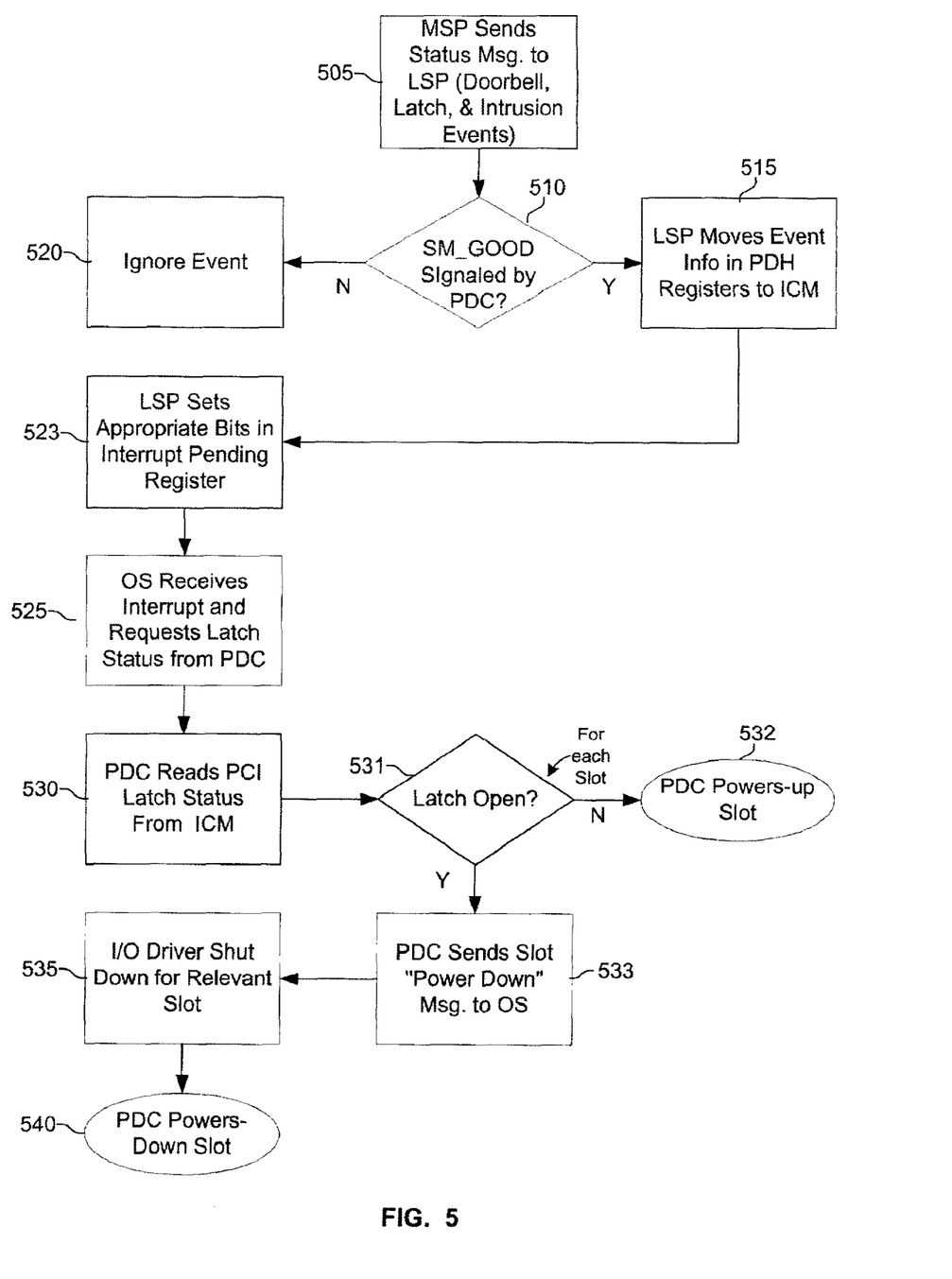
FIG. 5 is a flowchart illustrating exemplary steps performed when a latch on a card slot is opened or closed during normal operation.

FIG. 5 is a flowchart illustrating exemplary steps performed when a latch on a card slot is opened or closed during normal operation of system 100, i.e., when OS 103 has been booted and is running. As shown in FIG. 5, at step 505, if a latch interrupt is generated (because a board was removed from its slot), main service processor 130 sends a status message to local service processor 105. The status message may, alternatively, indicate a doorbell or an intrusion event. If, at step 510, PDC 102 has signaled (via an SM_GOOD signal) that the shared memory (in block 108) between the PDC and main service processor 130 has been initialized, then, at step 515, local service processor 105 moves the event information in external registers 107 to ICM (scratch RAM) 104, and latch initialization continues at step 523. If the shared memory has not been initialized, then at step 520, the event is ignored. At step 523, local service processor 105 sets the appropriate latch status bits in the interrupt pending register.

At step 525, OS 103 receives the interrupt and requests the latch status from PDC 102. At step 530, PDC 102 reads the latch status from ICM 104. At step 531, PDC 102 checks the latch status for each card slot 150. If a given latch is open, the PDC does not power up the slot (step 532), if a given latch 165 is closed, then at step 533, PDC 102 sends a slot "power down" message to OS 103. At step 535, OS 103 shuts down the I/O driver for the relevant slot 150, and at step 540, PDC 103 powers down the slot.

While exemplary embodiments of the present invention have been shown in the drawings and described above, it will be apparent to one skilled in the art that various embodiments of the present invention are possible. For example, the specific configuration of the system as shown in FIG. 1, as well as the particular sequence of steps described above in FIGS. 2 through 5 should not be construed as limited to the specific embodiments described herein. Modification may be made to these and other specific elements of the invention without departing from its spirit and scope as expressed in the following claims.

We claim:

1. In a computer system including plurality of cells, each comprising at least one processor having an operating system associated therewith, wherein each of the cells is connected to a peripheral backplane containing a plurality of peripheral I/O card slots, an event notification system for detecting and routing platform event information relating to removal and replacement of peripheral I/O cards during operation of the computer system, the event notification system comprising:

a supervisory processor, connected to each said cell via said backplane;

a plurality of doorbell switches, each associated with a specific said I/O card slot and operatively coupled to said supervisory processor, for providing, to the supervisory processor, a doorbell event indicating that a user is ready to remove a specific said I/O card from said card slot associated therewith;

a local service processor in each cell, interfaced to the operating system and operatively coupled to the supervisory processor via a link for sending said platform events including said doorbell event from the supervisory processor to the local service processor;

wherein the operating system powers down the card slot associated with the specific said I/O card in response to notification, from the local service processor, of the doorbell event.

2. The event notification system of claim 1, further including a plurality of latches, each associated with a single said I/O card slot and operatively coupled to said supervisory processor, for providing, to the supervisory processor, a latch event indicative of the presence of one of said cards in a specific said slot;

wherein one of said platform events includes said latch event; and wherein the operating system powers up the specific said slot in response to notification, from the local service processor, of said latch event indicating that a card has been inserted in said card slot.

3. The event notification system of claim 2, further including an access panel having an intrusion latch operatively coupled to the supervisory processor, for providing, to the supervisory processor, an intrusion event indicating whether the panel is open; wherein:

one of said platform events includes said intrusion event;

the operating system causes a pending interrupt to be stored in a register in response to notification, from the local service processor, that the access panel is open; and upon booting said operating system, said pending interrupt indicates that said intrusion event occurred since the last boot;

whereby, if no said intrusion event is indicated upon booting said operating system, boot time for the operating system is minimized by avoiding scanning for non-existent devices.

4. The event notification system of claim 3, wherein, after receiving notice of the intrusion event, the operating system causes indicia of said notice to be cleared so that the intrusion event is only reported once.

5. In a computer system including at least one cell comprising multiple processors, each of which has an operating system associated therewith, a method for removal and replacement of I/O cards while the computer system is operating, the method comprising the steps of:

notifying a supervisory processor that a doorbell event has occurred, when a doorbell switch, associated with an I/O card slot, is pressed;

sending a message, indicating that said doorbell event has occurred, from the supervisory processor to a local service processor on the cell containing the operating system responsible for the I/O card slot;

sending a notification of the doorbell event and indicia of the I/O card slot associated with the doorbell event from the local service processor to the operating system on the cell associated with the slot for which the doorbell switch was pressed; and powering off the slot for the I/O card slot associated with the doorbell event.

6. The method of claim 5, wherein the slot associated with the latch event has an associated I/O driver, including the additional step of shutting down the I/O driver for the I/O card slot associated with the doorbell event prior to powering off the slot.

7. The method of claim 5, wherein the message from the local service processor indicating the latch event is written to RAM.

8. The method of claim 5, wherein a call is issued from the operating system to a firmware routine to get the message indicating the latch event.

9. The method of claim 8, wherein a notification is sent from the firmware routine to the operating system indicating the slot associated with the latch event.

10. The method of claim 5, wherein an attention light is illuminated after the slot is illuminated, to notify a user that the card in the I/O card slot associated with the doorbell event can be removed.

11. The method of claim 5, wherein the supervisory processor notifies only the local service processor in the cell containing the operating system responsible for controlling the card associated with the doorbell event.

12. The method of claim 5, wherein, when a board is re-inserted into the slot, a signal indicating the occurrence of a latch event is generated for the I/O card slot associated with the slot into which the card was re-inserted, including the additional steps of:

notifying the supervisory processor of the latch event;

sending notification of said latch event from the supervisory processor to the local service processor on the cells containing the operating system responsible for the I/O card slot;

writing a message from the local service processor indicating the latch event;

issuing a call from the operating system to retrieve the message indicating the latch event;

sending a notification to the operating system indicating the slot associated with the latch event; and powering up the slot associated with the latch event, thereby making the slot available for use without performing a re-boot operation.

13. The method of claim 12, including the additional step of enabling the I/O driver for the specific slot associated with the latch event prior to powering up the specific slot.

14. The method of claim 12, wherein the local service processor writes said message, indicating that said doorbell event has occurred, to scratch RAM.

15. The method of claim 12, wherein the operating system calls a firmware routine to get a specific said doorbell event after notification of the doorbell event is sent to the operating system.

16. The method of claim 15, wherein the firmware routine notifies the operating system of the specific slot that is associated with the doorbell event.

17. The method of claim 12, wherein the supervisory processor notifies only the local service processor in the cell containing the operating system responsible for controlling the card associated with the latch event.

18. In a computer system including at least one cell having an operating system associated therewith, and including an access panel that provides access to peripheral I/O cards controlled by the operating system, a method for minimizing boot time for the operating system by avoiding scanning for non-existent devices, the method comprising the steps of:

notifying a supervisory processor that an intrusion event has occurred when said access panel has been opened;

sending notification of said intrusion event from the supervisory processor to a local service processor;

writing a message from the local service processor indicating the intrusion event;

issuing a call from the operating system to retrieve the message indicating the intrusion event;

sending a notification to the operating system indicating the slot associated with the intrusion event;

storing a pending interrupt in a register in response to notification, from the local service processor, that the access panel is open; and upon booting said operating system, checking for said pending interrupt to determine whether said intrusion event occurred since the last boot;

whereby, if no said intrusion event is indicated upon booting said operating system, boot time for the operating system is minimized by avoiding scanning for non-existent devices.

19. The method of claim 18, wherein the message from the local service processor indicating the intrusion event is written to RAM.

20. The method of claim 19, wherein a call is issued from the operating system to a firmware routine to get the message indicating the intrusion event.

\* \* \* \* \*

UNITED STATES PATENT AND TRADEMARK OFFICE
CERTIFICATE OF CORRECTION

| | | |
|---|---|---|
| PATENT NO. | : 6,910,142 B2 | |
| APPLICATION NO. | : 09/917413 | |
| DATED | : June 21, 2005 | |
| INVENTOR(S) | : Edward A Cross et al. | |

It is certified that error appears in the above-identified patent and that said Letters Patent is hereby corrected as shown below:

In column 8, lines 57-67, column 9, lines 1-13, and column 10, lines 1-11, delete "18. In a computer system including at least one cell having an operating system associated therewith, and including an access panel that provides access to peripheral I/O cards controlled by the operating system, a method for minimizing boot time for the operating system by avoiding scanning for non-existent devices, the method comprising the steps of: notifying a supervisory processor that an intrusion event has occurred when said access panel has been opened; sending notification of said intrusion event from the supervisory processor to a local service processor; writing a message from the local service processor indicating the intrusion event; issuing a call from the operating system to retrieve the message indicating the intrusion event; sending a notification to the operating system indicating the slot associated with the intrusion event; storing a pending interrupt in a register in response to notification, from the local service processor, that the access panel is open; and upon booting said operating system, checking for said pending interrupt to determine whether said intrusion event occurred since the last boot; whereby, if no said intrusion event is indicated upon booting said operating system, boot time for the operating system is minimized by avoiding scanning for non-existent devices.

19. The method of claim 18, wherein the message from the local service processor indicating the intrusion event is written to RAM.

UNITED STATES PATENT AND TRADEMARK OFFICE
CERTIFICATE OF CORRECTION

| | |
|---|---|
| PATENT NO. | : 6,910,142 B2 |
| APPLICATION NO. | : 09/917413 |
| DATED | : June 21, 2005 |
| INVENTOR(S) | : Edward A Cross et al. |

It is certified that error appears in the above-identified patent and that said Letters Patent is hereby corrected as shown below:

20. The method of claim 19, wherein a call is issued from the operating system to a firmware routine to get the message indicating the intrusion event.".

Signed and Sealed this

Eleventh Day of August, 2009

David J. Kappos
*Director of the United States Patent and Trademark Office*